US008774626B2

(12) United States Patent
Bernstein et al.

(10) Patent No.: US 8,774,626 B2
(45) Date of Patent: Jul. 8, 2014

(54) DISTRIBUTED WAVELENGTH CONVERSION CONTROL FOR SIGNALING PROTOCOLS

(75) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 42 days.

(21) Appl. No.: 13/402,979

(22) Filed: Feb. 23, 2012

(65) Prior Publication Data

US 2012/0148243 A1 Jun. 14, 2012

Related U.S. Application Data

(63) Continuation of application No. 12/173,624, filed on Jul. 15, 2008, now Pat. No. 8,145,056.

(60) Provisional application No. 60/968,231, filed on Aug. 27, 2007.

(51) Int. Cl.
*H04B 14/00* (2006.01)
*H04J 14/02* (2006.01)

(52) U.S. Cl.
CPC ......... *H04J 14/0246* (2013.01); *H04J 14/0258* (2013.01); *H04J 14/0284* (2013.01); *H04J 14/0267* (2013.01); *H04J 14/0269* (2013.01); *H04J 14/0257* (2013.01)
USPC ................... 398/48; 398/49; 398/50; 398/57; 398/79; 398/173; 398/175; 398/177

(58) Field of Classification Search
USPC ................. 398/3–8, 45–57, 79, 173, 175–181
See application file for complete search history.

(56) References Cited

U.S. PATENT DOCUMENTS

| 7,272,310 B2 | 9/2007 | Maciocco et al. |
| 7,359,377 B1 * | 4/2008 | Kompella et al. ............. 370/389 |
| 7,466,913 B2 | 12/2008 | Sanlee et al. |

(Continued)

FOREIGN PATENT DOCUMENTS

| CN | 1426189 A | 6/2003 |
| CN | 1533060 A | 9/2004 |
| JP | 2004007204 A | 1/2004 |

OTHER PUBLICATIONS

Farrel et al: "A Path Computation Element (PCE)-Based Architecture", IETF Network Working Group, RFC 4655, Aug. 2006, pp. 1-40.*

(Continued)

*Primary Examiner* — Li Liu
(74) *Attorney, Agent, or Firm* — Conley Rose, P.C.; Grant Rodolph; Brandt D. Howell

(57) ABSTRACT

A network component comprising at least one processor configured to implement a method comprising obtaining a wavelength availability information for a path, determining whether to implement a wavelength assignment based on the wavelength availability information, updating the wavelength availability information when the wavelength assignment is to be implemented, and forwarding the wavelength availability information. Also included is a method comprising obtaining a wavelength availability information, comparing a number of wavelengths in the wavelength availability information to a threshold, determining whether to implement wavelength conversion along a path when the number of available wavelengths is less than or about equal to the threshold, and resetting the wavelength availability information when wavelength conversion is to be implemented.

19 Claims, 6 Drawing Sheets

(56) References Cited

U.S. PATENT DOCUMENTS

| | | | |
|---|---|---|---|
| 2003/0099014 A1 | 5/2003 | Egner et al. | |
| 2003/0147645 A1 | 8/2003 | Imajuku et al. | |
| 2003/0198227 A1* | 10/2003 | Matsuura et al. | 370/395.2 |
| 2004/0190900 A1 | 9/2004 | Yagyu | |
| 2004/0208433 A1 | 10/2004 | Cho et al. | |
| 2004/0220886 A1* | 11/2004 | Kumaran et al. | 705/400 |
| 2005/0188100 A1* | 8/2005 | Le Roux et al. | 709/238 |
| 2008/0056717 A1 | 3/2008 | Niven-Jenkins et al. | |
| 2009/0296719 A1* | 12/2009 | Maier et al. | 370/400 |
| 2010/0086306 A1 | 4/2010 | D'Alessandro et al. | |

OTHER PUBLICATIONS

Foreign Communication From a Related Counterpart Application—International Search Report and Written Opinion, PCT/CN2008/072160, Dec. 11, 2008, 8 pages.
Zhang, et al., "A Review of Routing and Wavelength Assignment Approaches for Wavelength-Routed Optical WDM Networks," Optical Networks Magazine, Jan. 2000, pp. 47-60.
Shimizu, et al., "Wavelength Assignment Scheme for WDM Networks with Limited-Range Wavelength Converters," Journal of Optical Networking, May 2005, vol., 16, No. 5, pp. 410-421.
Bernstein, et al., "Signaling Extensions for Wavelength Switched Optical Networks," draft-ietf-ccamp-wson-signaling-00.txt, Oct. 29, 2007, 32 pages.
Lee, et al., "PCEP Requirements for WSON Routing and Wavelength Assignment," draft-ietf-pce-wson-routing-wavelength-00.txt, Oct. 29, 2007, 21 pages.
Series G: Transmission Systems and Media, Digital Systems and Networks, Digital Section and Digital Line System—Digital Line Systems, Optical Transport Network Physical Layer Interfaces, ITU-T, Telecommunication Standardization Sector of ITU, G959.1, Feb. 2001, 50 pages.
Series G: Transmission Systems and Media, Digital Systems and Networks, Transmission Media Characteristics—Characteristics of Optical Components and Subsystems, Spectral Grids for WDM Applications: DWDM Frequency Grid, ITU-T, Telecommunications Standardization Sector of ITU, G.694.1, Jun. 2002, 11 pages.
Series G: Transmission Systems and Media, Digital Systems and Networks, Digital Terminal Equipments—General, Series Y: Global Information Infrastructure, Internet Protocol Aspects and Next Generation Networks, Internet Protocol Aspects—Transport, Interfaces for the Optical Transport Network (OTN), ITU-T, Telecommunication Standardization Sector of ITU, G.709/Y/1331, Mar. 2003, 118 pages.
Series G: Transmission Systems and Media, Digital Systems and Networks, Transmission Media Characteristics—Characteristics of Optical Components and Subsystems, Spectral Grids for WDM Applications: CWDM Wavelength Grid ITU-T, Telecommunication Standardization Sector of ITU, G.694.2, Dec. 2003, 10 pages.
Series G: Transmission Systems and Media, Digital Systems and Networks, Digital Section and Digital Line System—Optical Fibre Submarine Cable Systems, Forward Error Correction for High Bit-Rate DWDM Submarine Systems ITU-T, Telecommunications Standardization Sector of ITU, G.975.1, Feb. 2004, 58 pages.
Series G: Transmission Systems and Media, Digital Systems and Networks, Transport of IEEE 10G base-R in Optical Transport Networks (OTN), ITU-T Telecommunication Standardization Sector of ITU, Series G, Supplement 43, Nov. 2006, 15 pages.
Bernstein, G., et al., "Signaling Extensions for Wavelength Switched Optical Networks," draft-ietf-ccamp-wson-signaling-02.txt, Sep. 13, 2011, 23 pages.
Bernstein, G., et al., "Applicability of GMPLS and PCE to Wavelength Switched Optical Networks," draft-bernstein-ccamp-wavelength-switched-00.txt, Jun. 25, 2007, 11 pages.
Bernstein, G., Ed., et al., "Framework for GMPLS and PCE Control of Wavelength Switched Optical Networks," draft-bernstein-ccamp-wavelength-switched-03.txt, Feb. 19, 2008, 68 pages.

Bernstein, G., Ed., et al., "Framework for GMPLS and PCE Control of Wavelength Switched Optical Networks (WSON)," draft-ietf-ccamp-wavelength-switched-framework-00.txt, May 13, 2008, 68 pages.
Bernstein, G., et al., "Routing and Wavelength Assignment Information Encoding for Wavelength Switched Optical Networks," draft-bernstein-ccamp-wson-encode-00.txt, Jul. 3, 2008, 42 pages.
Bernstein, G., et al., "Routing and Wavelength Assignment Information Model for Wavelength Switched Optical Networks," draft-bernstein-ccamp-wson-info-03.txt, Jul. 7, 2008, 30 pages.
Kiran Koushik, A.S., et al., "PCE Communication Protocol (PCEP) Management Information Base," draft-kkoushik-pce-pcep-mib-01.txt, 19 pages.
Kiran Koushik, A.S., et al., "PACE Communication Protocol (PCEP) Management Information Base," draft-kkoushik-pce-pcep-mib-02.txt, 22 pages.
Lee, Y., et al., "Path Computation Element Communication Protocol (PCECP) Requirements and Protocol Extensions in Support of Global Concurrent Optimization," draft-ietf-pce-global-concurrent-optimization-00.txt, Jun. 22, 2007, 32 pages.
Lee, Y., et al., "Path Computation Element Communication Protocol (PCECP) Requirements and Protocol Extensions In Support of Global Concurrent Optimization," draft-ietf-pce-global-concurrent-optimization-04.txt, Jul. 14, 2008, 31 pages.
Lee, Y., et al., "PCEP Requirements and Extensions for WSON Routing and Wavelength Assignment," draft-lee-pce-wson-routing-wavelength-02.txt, Jun. 27, 2008, 11 pages.
Lee, Y., et al., "PCEP Requirements for WSON Routing and Wavelength Assignment," draft-ietf-pce-wson-routing-wavelength-06.txt, Oct. 30, 2011, 14 pages.
Le Roux, J.L., Ed., "IS-IS Protocol Extensions for Path Computation Element (PCE) Discovery," draft-ietf-pce-disco-proto-isis-06.txt, Jun. 2007, 20 pages.
Le Roux, J.L., Ed., "OSPF Protocol Extensions for Path Computation Element (PCE) Discovery," draft-ietf-pce-disco-proto-ospf-06.txt, Jun. 2007, 22 pages.
Le Roux, J.L., "Encoding of Objective Functions in Path Computation Element (PCE) Communication and Discovery Protocols," draft-leroux-pce-of-01.txt, Jul. 2007, 20 pages.
Le Roux, J.L., et al., "Encoding of Objective Functions in Path Computation Element Communication Protocol (PCEP)," draft-ietf-pce-of-03.txt, Jul. 2008, 19 pages.
Otani, T., et al., "Generalized Labels of Lambda-Switching Capable Label Switching Routers (LSR)," draft-otani-ccamp-gmpls-lambda-labels-00.txt, Jun. 2007, 13 pages.
Otani, T., et al., "Generalized Labels of Lambda-Switching Capable Label Switching Routers (LSR)," draft-otani-ccamp-gmpls-lambda-labels-02.txt, Feb. 24, 2008, 11 pages.
Vasseur, JP., Ed., et al., "Path Computation Element (PCE) Communication Protocol (PCEP)," draft-ietf-pce-pcep-08.txt, Jul. 5, 2007, 73 pages.
Vasseur, JP., Ed., et al., "Path Computation Element (PCE) Communication Protocol (PCEP)," draft-ietf-pce-pcep-12.txt, 77 pages.
Xu, S., et al., "Extensions to GMPLS RSVP-TE for Bidirectional Lightpath with the Same Wavelength," draft-xu-rsvpte-bidir-wave-00, Jun. 2007, 11 pages.
Xu, S., et al., "Extensions to GMPLS RSVP-TE for Bidirectional Lightpath with the Same Wavelength," draft-xu-rsvpte-bidir-wave-01.txt, Nov. 12, 2007, 13 pages.
Ash, J., Ed., "Path Computation Element (PCE) Communication Protocol Generic Requirements," RFC 4657, Sep. 2006, 21 pages.
Awduche, D., et al., "RSVP-TE: Extensions to RSVP for LSP Tunnels," RFC 3209, Dec. 2001, 57 pages.
Berger, L., Ed., et al., "Generalized Multi-Protocol Label Switching (GMPLS) Signaling Functional Description," RFC 3471, Jan. 2003, 31 pages.
Berger, L., Ed., et al., "Generalized Multi-Protocol Label Switching (GMPLS) Signaling Resource Reservation Protocol-Traffic Engineering (RSVP-TE) Extensions," RFC 3473, Jan. 2003, 43 pages.
Bradner, S., "Key Words for Use in RFCs to Indicate Requirement Levels," RFC 2119, Mar. 1997, 3 pages.
Crocker, D., Ed., et al., "Augmented BNF for Syntax Specifications: ABNF," RFC 2234, Nov. 1997, 16 pages.

(56) References Cited

OTHER PUBLICATIONS

Farrel, A., Ed., et al., Encoding of Attributes for Multiprotocol Label Switching (MPLS) Label Switched Path (LSP) Establishment Using Resource Reservation Protocol-Traffic Engineering (RSVP-TE), RFC 4420, Feb. 2006, 22 pages.

Farrel, A., et al., "A Path Computation Element (PCE) Based Architecture," RFC 4655, Aug. 2006, 38 pages.

Kompella, K., et al., "Signaling Unnumbered Links in Resource Reservation Protocol—Traffic Engineering (RSVP-TE)," RFC 3477, Jan. 2003, 10 pages.

Lang, J.P., Ed., et al., RSVP-TE Extensions in Support to End-to-End Generalized Multi-Protocol Label Switching (GMPLS) Recovery, RFC 4872, May 2007, 48 pages.

Le Roux, JL., Ed., et al., "OSPF Protocol Extensions for Path Computation Element (PCE) Discovery," RFC 5088, Jan. 2008, 19 pages.

Le Roux, JL., Ed., et al., IS-IS Protocol Extensions for Path Computation Element (PCE) Discovery, RFC 5089, Jan. 2008, 18 pages.

Mannie, E., Ed., et al., "Recovery (Protection and Restoration) Terminology for Generalized Multi-Protocol Label Switching (GMPLS)," RFC 4427, Mar. 2006, 23 pages.

Mannie, E., et al., "Generalized Multi-Protocol Label Switching (GMPLS) Extensions for Synchronous Optical Network (SONET) and Synchronous Digital Hierarchy (SDH) Control," RFC 4606, Aug. 2006, 26 pages.

McCloghrie, K., et al., "Structure of Management Information Version 2 (SMIv2)," RFC 2578, Apr. 1999, 43 pages.

Papadimitriou, D., Ed., et al., "Generalized Multi-Protocol Label Switching (GMPLS) Signaling Extensions for G.709 Optical Transport Networks Control," RFC 4328, Jan. 2006, 23 pages.

Andriolli, N., et al., "Label Preferences Schemes in GMPLS Controlled Networks," IEEE Communications Letters, vol. 10, No. 12, Dec. 2006, pp. 849-851.

Winzer, P., et al., "Advanced Optical Modulation Formats," Proceedings of the IEEE, vol. 94, No. 5, May 2006, pp. 952-985.

Office Action dated Sep. 22, 2011, 9 pages, U.S. Appl. No. 12/173,624, filed on Jul. 15, 2008.

Office Action dated Apr. 28, 2011, 19 pages, U.S. Appl. No. 12/173,624, filed on Jul. 15, 2008.

Notice of Allowance dated Nov. 23, 2011, 7 pages, U.S. Appl. No. 12/173,624, filed on Jul. 15, 2008.

* cited by examiner

DISTRIBUTED WAVELENGTH CONVERSION CONTROL FOR SIGNALING PROTOCOLS

CROSS-REFERENCE TO RELATED APPLICATIONS

The present application is a continuation of U.S. patent application Ser. No. 12/173,624 filed Jul. 15, 2008 by Bernstein et al. and entitled "Distributed Wavelength Conversion Control for Signaling Protocols," which claims priority to U.S. Provisional Patent Application No. 60/968,231 filed Aug. 27, 2007 by Bernstein et al. and entitled "Method for Distributed Wavelength Conversion Control Compatible with Modern Signaling Protocols," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the signals transported along the path. The path assignment may be implemented separately by a path computation element (PCE) while the wavelength assignment may be distributed among the NEs along the path. However, the NEs along the path may comprise NEs with wavelength conversion capabilities. Such information, in addition to other wavelength assignment or availability information, may be used for determining whether to implement a wavelength conversion along the path in a distributed wavelength assignment scheme.

SUMMARY

In one embodiment, the disclosure includes a network component comprising at least one processor configured to implement a method comprising obtaining a wavelength availability information for a path, determining whether to implement a wavelength assignment based on the wavelength availability information, updating the wavelength availability information when the wavelength assignment is to be implemented, and forwarding the wavelength availability information.

In another embodiment, the disclosure includes a method comprising obtaining a wavelength availability information, comparing a number of wavelengths in the wavelength availability information to a threshold, determining whether to implement wavelength conversion along a path when the number of available wavelengths is less than or about equal to the threshold, and resetting the wavelength availability information when wavelength conversion is to be implemented.

In yet another embodiment, the disclosure includes an apparatus comprising a network element configured to couple to a previous network element along a first portion of a path and a subsequent network element along a second portion of the path, wherein the network element is configured to receive a wavelength availability information from the previous network element and forward an updated wavelength availability information to the subsequent network element.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for determining whether to implement wavelength conversion during distributed wavelength assignment along a path. The path may comprise a plurality of NEs including at least one NE with wavelength conversion capability. Specifically, the NEs may communicate wavelength availability information during a distributed wavelength assignment. The wavelength availability information may comprise available or unassigned wavelengths along the path. The NEs may also communicate path or routing information such as a number of NEs along the path, a number of NEs with wavelength conversion capability along the path, or both. The wavelength availability information, the routing information, or both may be used to determine whether wavelength conversion is to be implemented. When wavelength conversion is to be implemented, the NE assigns a wavelength to the previous portion of the path that is different from the wavelength that is ultimately assigned to the remaining portion of the path. Accordingly, the NE may update and forward the wavelength availability information to the remaining NEs or hops along the path.

Figure 1:
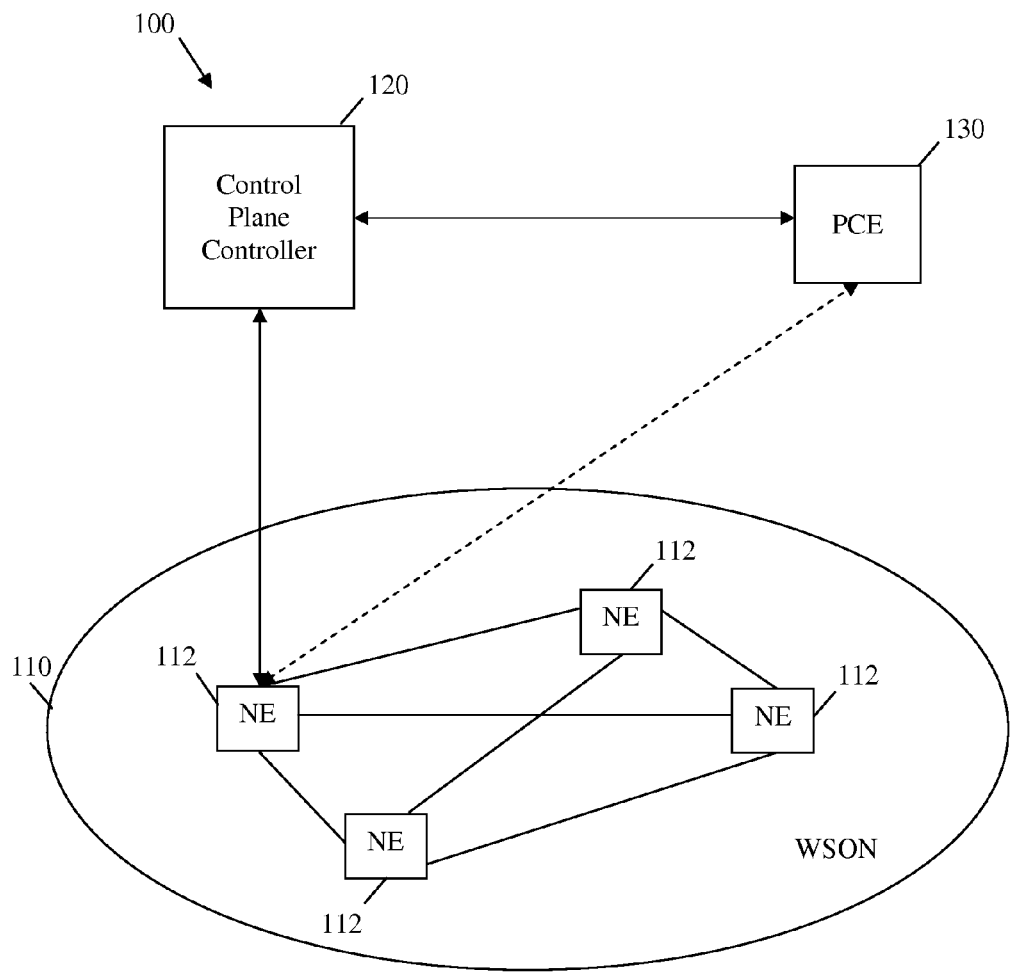
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112, also referred to as nodes, may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may have wavelength conversion capability. For instance, some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE Protocol (PCEP), provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelengths or other information that may be used for the RWA from the control plane controller 120, from the NEs 112, or both. The PCE 130 may process the information to obtain the RWA, for example, by computing the routes or paths, e.g. lightpaths, for the optical signals, specifying the optical wavelengths that are used for each lightpath, and determining the NEs 112 along the lightpath at which the optical signal should be converted to an electrical signal or a different wavelength. The RWA may designate at least one path for each incoming signal and at least one wavelength associated with each path. The PCE 130 may then send all or part of the RWA to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WS ON 110, such as a NE 112.

In some embodiments, RWA required information may be sent to the PCE 130 by a path computation client (PCC). The PCC may be any client application requesting a path computation to be performed by the PCE 130. The PCC may also be any network component that makes such a request, such as the control plane controller 120, or any NE 112.

Figure 2:
FIG. 2 is a schematic diagram of an embodiment of a combined RWA architecture.

FIG. 2 illustrates an embodiment of a combined RWA architecture 200. In the combined RWA architecture 200, the PCC 210 communicates a RWA request and the related information to the PCE 220, which implements both the routing assignment and the wavelength assignment functions based on the sent information and using a single computation entity, such as a processor. For example, the processor may process the information using a single or multiple algorithms to compute the lightpaths as well as to assign the optical wavelengths for each lightpath. The amount of information needed by the PCE 220 to compute the RWA may vary depending on the algorithm used. If desired, the PCE 220 may not compute the RWA until sufficient network links are established between the NEs or when sufficient information about the NEs and the network topology is provided. The combined RWA architecture 200 may be preferable for network optimization, smaller WSONs, or both.

Figure 3:
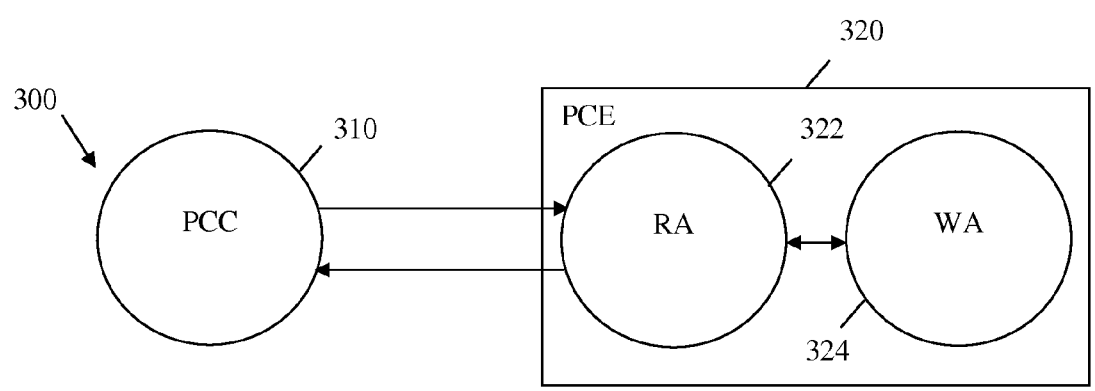
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the required information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC may receive a path from the source node to a destination node along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
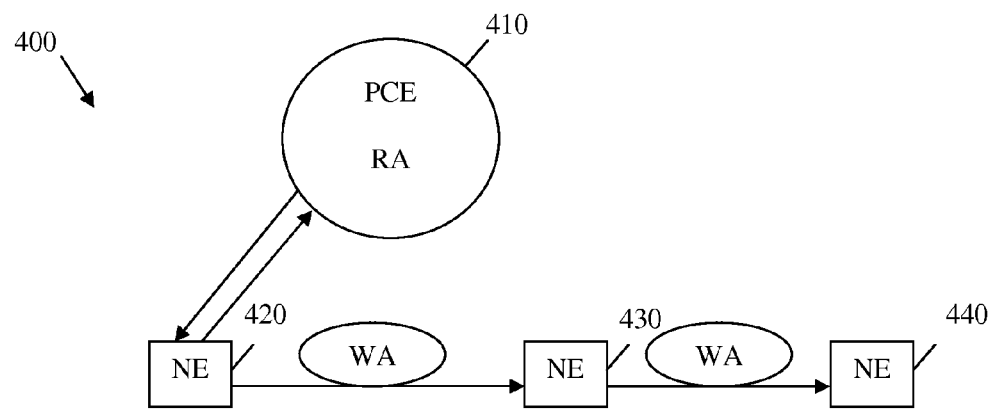
FIG. 4 is a schematic diagram of an embodiment of a distributed RWA architecture.

FIG. 4 illustrates a distributed wavelength assignment architecture 400. In the distributed wavelength assignment architecture 400, the PCE 410 may receive some or all of the RWA required information from the NEs 420, 430, and 440, perhaps via direct link, and implements the routing assignment. The RWA required information may comprise a plurality of available wavelengths at the NEs 420, 430, and 440. The PCE 410 may then directly or indirectly pass the routing assignment to the individual NEs 420, 430, and 440. The routing assignment may comprise an ordered list of NEs along the assigned path. The NEs 420, 430, and 440 may use the routing assignment information and the available wavelengths to assign wavelengths at the local links between the NEs 420, 430, and 440.

For instance, the NE 420 may receive wavelength availability information from the NEs 430 and 440 and send some or all of the wavelength availability information, in addition to local wavelength availability information, to the PCE 410. The PCE 410 may compute the lightpaths using the received information and send the list of lightpaths to the NE 420. The NE 420 may use the list of lightpaths to identify the NE 430 as the next NE in the lightpath. The NE 420 may establish a link to the NE 430 and assign an initial wavelength for transmission over the link using the wavelength availability information. The NE 430 may receive the list of lightpaths from the NE 420, use the list of lightpaths to identify the NE 440 as the next NE in the lightpath, establish a link to the NE 440, and assign the same or a different wavelength for transmission over the link using the wavelength availability information. Thus, the signals may be routed and the wavelengths may be assigned in a distributed manner between the remaining NEs in the network. Assigning the wavelengths at the individual NEs may reduce the amount of information that has to be sent to the PCE 410.

Figure 5:
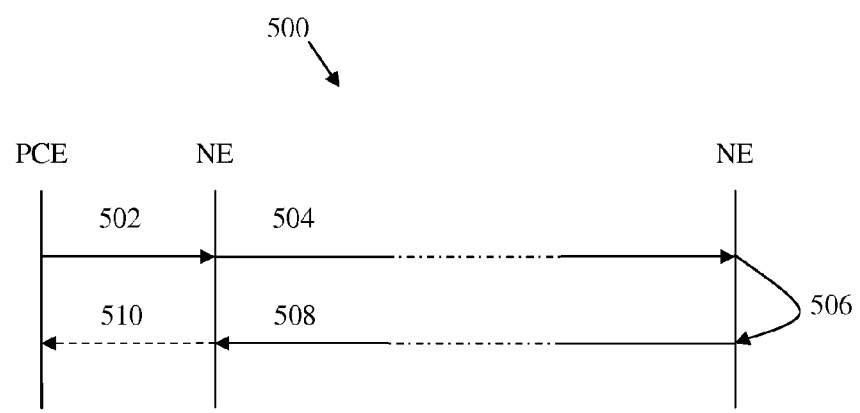
FIG. 5 is a protocol diagram of an embodiment of distributed wavelength assignment communications.

FIG. 5 illustrates an embodiment of a distributed wavelength assignment communications method 500 between a plurality of NEs. The method 500 may be implemented using any suitable signaling protocol, such as GMPLS, or similar messaging protocol to exchange information between the NEs. In the method 500, the PCE may receive a path computation request from an NE or other PCC (not shown). The request may include lightpath constraints such as a RWA computation option, a route parameter, a wavelength selection preference, an optimization degree, a timeliness characteristic, a duration, or combinations thereof. The PCE may calculate or locate a path through the network that meets the lightpath constraints.

For instance, the PCE may calculate a path comprising a plurality of NEs coupled to each other via a plurality of links. The PCE may send a message comprising the routing assignment, such as a path computation reply 502, to the first or source NE in the calculated path. In some embodiments, the path computation reply 502 may comprise an initial or suggested wavelength assignment, which may be used, updated or changed when implementing distributed wavelength assignment among the NEs. Upon receiving the path computation 502, the first or source NE may implement a distributed wavelength assignment with the other NEs in the path. Specifically, the NEs may each forward, one at a time, a path message 504 comprising updated wavelength availability information in addition to the routing assignment. The last or destination NE in the path may receive the path message 504, assign a wavelength to at least a portion of the path at 506, and send back a reserve message 508 comprising the wavelength assignment to the previous NEs.

In the case where no wavelength can be assigned to the path, for example when no common wavelength is available at all the NEs, the destination NE or any other NE making such a determination may send back a path error message to the previous NEs or hops to inform the NEs that the distributed wavelength assignment is blocked. Additionally, the source NE or node may send a confirmation message 510 to the PCE to inform the PCE whether a path wavelength assignment has been established or blocked.

Figure 6:
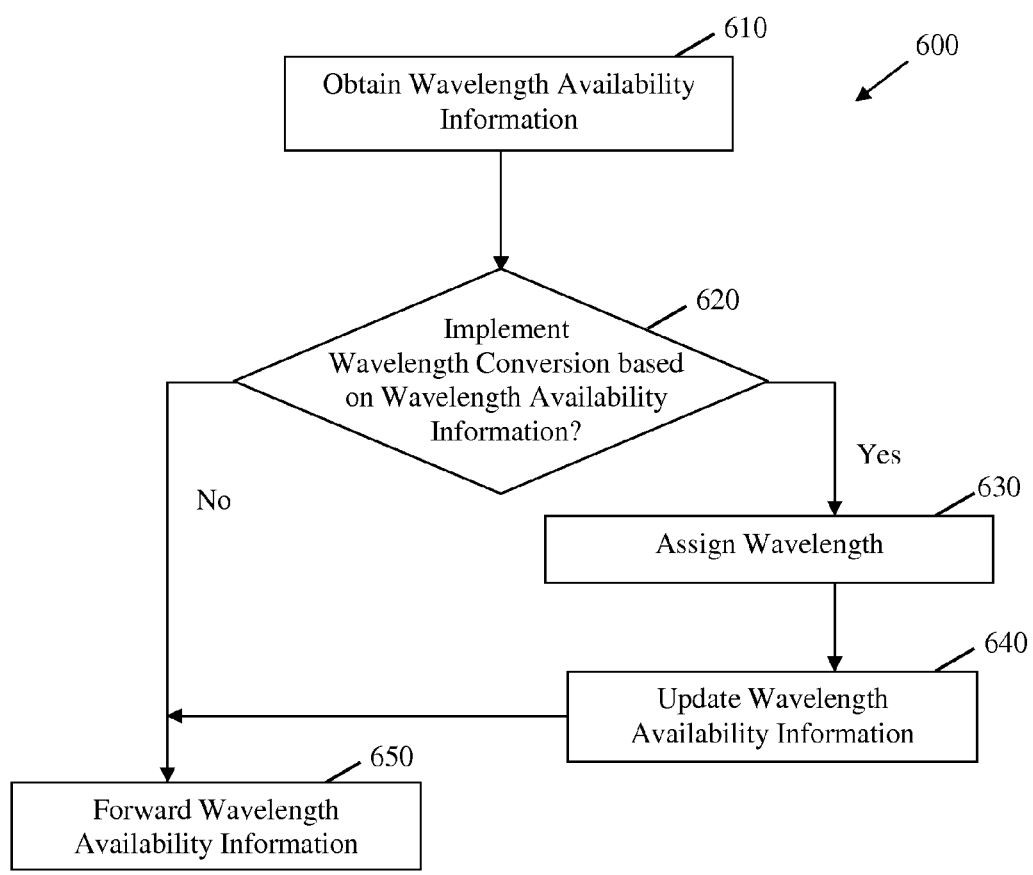
FIG. 6 is a flowchart of an embodiment of a wavelength conversion determination method.

FIG. 6 illustrates one embodiment of a wavelength conversion determination method 600. The method 600 may implement wavelength conversion in a distributed wavelength assignment based on the wavelength availability information. Specifically, the wavelength availability information may be obtained and used to decide whether a wavelength conversion should be implemented. When the wavelength conversion is to be implemented, a wavelength may be assigned to the previous portion of the path and the wavelength availability information may be updated and forwarded to the next portion of the path. Alternatively, when no wavelength conversion is to be implemented, the wavelength availability information may be updated and forwarded without assigning a wavelength. The method 600 may be implemented at any NE with wavelength conversion capability along a path.

At block 610, the method 600 may obtain the wavelength availability information. The wavelength availability information may comprise at least some of the available and/or assigned wavelengths at the NEs along the path. For instance, the wavelength availability information may comprise a list of the available wavelengths at the previous NEs or hops. Additionally, the wavelength availability information may comprise at least some of the local available wavelengths at the NE with wavelength conversion capability, for example a list of the local available wavelengths. In an embodiment, the method 600 may receive the available wavelengths corresponding to the previous NEs and combine the received available wavelength with the local available wavelengths. In another embodiment, the wavelength availability information may comprise an intersection of at least some of the available wavelengths. For instance, the method 600 may combine the common wavelengths between the received available wavelengths and the local available wavelengths and disregard the remaining wavelengths. As such, the intersection of the available wavelengths may comprise a plurality of common available wavelengths between at least some of the NEs along the path and the NE with wavelength conversion capability. The number of common available wavelengths in the intersection of available wavelengths may be referred to as the cardinality of the intersection. In some embodiments, the wavelength availability information may be initially created at the source NE or node and comprise the local available wavelengths at the source node. The wavelength availability information at the source node may also comprise a list of wavelengths forwarded from a PCE. The method 600 may then proceed to block 620.

At block 620, the method 600 may determine whether to implement wavelength conversion based on the wavelength availability information. For instance, the method 600 may compare the number of the available wavelengths to a threshold, such that a wavelength conversion is to be implemented when the number of available wavelengths is about equal to or below the threshold. The threshold may be equal to a fixed number of available wavelengths, which may be predetermined by a network manager or operator. The number may be predetermined based on criteria used to improve distributed wavelength assignment, such as to reduce the number of NEs implementing wavelength conversion in a WSON, to reduce the chances of path blocking in a distributed wavelength assignment, or both. For instance, using a relatively large threshold value may reduce the number of NEs implementing wavelength conversion, but may increase the chances of path blocking. Alternatively, using a relatively low threshold value may reduce the chances of path blocking, but may increase the number of NEs implementing wavelength conversion.

In other embodiments, the threshold may be calculated as a function of the number of the remaining NEs or hops along the path and at least a predetermined weighting factor. The number of the remaining NEs along the path may be obtained from the routing assignment information, which may be received by the NE having wavelength conversion capability. For instance, the routing assignment information may comprise an ordered list of NEs along the assigned path, an ordered list of NEs with wavelength conversion capability along the assigned path, or both. The weighting factor may be predetermined, similar to the fixed number of wavelengths threshold, based on criteria used to improve distributed wavelength assignment.

Additionally or alternatively, the method 600 may decide to implement wavelength conversion when the number of available wavelengths is equal to about zero, i.e., when substantially no wavelengths are available at the NE. The method 600 may proceed to block 630 if the condition at block 620 is met. Otherwise, the method 600 may proceed to block 650.

At block 630, the method 600 may assign a wavelength to a previous portion of the path comprising at least a link coupled to the NE and the previous NE along the path. Additionally, the previous portion of the path may comprise a plurality of links between at least some of the previous NEs. The wavelength assigned to the previous portion of the path may be different from a wavelength assigned to a remaining portion of the path comprising at least a link coupled to the NE and the next NE along the path. Additionally, the remaining portion of the path may comprise a plurality of links between at least some of the remaining NEs. In some embodiments, the wavelength assigned to the remaining portion of the path may be assigned at a subsequent NE along the path. In other embodiments, the method 600 may assign one wavelength to the previous portion of the path and a different wavelength to the remaining portion of the path. The method 600 may then proceed to block 640.

At block 640, the method 600 may update the wavelength availability information. For instance, the method 600 may update the local available wavelengths at the NE, the list of available wavelengths at the previous NEs, or both. When wavelength conversion is to be implemented at a node, the local available wavelengths may represent all of the available wavelengths for the subsequent link. In other words, the wavelength availability information from the previous network elements does not need to be included in the wavelength availability information sent to the subsequent NE. As such, the wavelength availability information may be updated or reset by retaining the local available wavelengths and disregarding any available wavelengths at the previous NEs. Alternatively, the local available wavelengths at the NE may be updated to indicate that one of the local available wavelengths is assigned to the remaining portion of the path and is no longer available. In addition, the list of available wavelengths at the previous NEs may be updated to indicate that one of the available wavelengths is assigned to the previous portion of the path and is no longer available. The local available wavelength assigned to the remaining portion of the path may be different from the available wavelength at the previous NEs assigned to the previous portion of the path. The method 600 may then proceed to block 650.

At block 650, the method 600 may forward the wavelength availability information to the next NE along the path. Specifically, the method 600 may forward the local wavelength availability information when wavelength conversion is to be implemented. Alternatively, the forwarded wavelength availability information may comprise the combination or intersection of local available wavelengths and available wavelengths at the previous NE along the path when wavelength conversion is not to be implemented.

Figure 7:
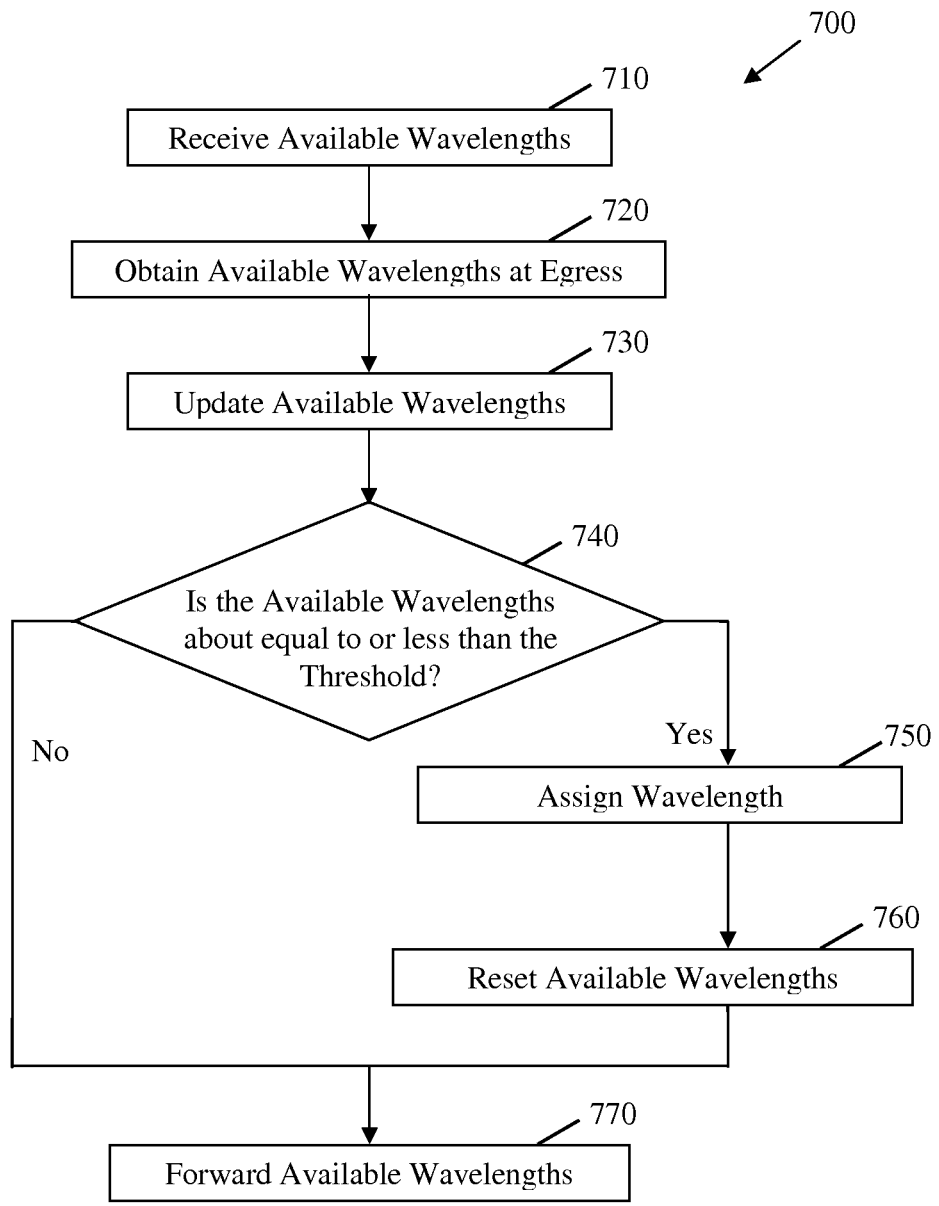
FIG. 7 is a flowchart of another embodiment of a wavelength conversion determination method.

FIG. 7 illustrates another embodiment of a wavelength conversion determination method 700. Similar to the method 600, the method 700 may be implemented at an NE with wavelength conversion capability as part of a distributed wavelength assignment. Specifically, the method 700 may determine whether to implement wavelength conversion based on: (1) the intersection of available wavelengths between the NE and the previous NEs along the path; (2) the number of remaining NEs or hops along the path and the intersection of available wavelengths; or (3) the number of remaining NEs or hops with wavelength conversion capability along the path and the intersection of available wavelengths.

At block 710, the method 700 may receive at least some of the available wavelengths from the previous NEs along the path. For instance, the method 700 may receive a list of available wavelengths or a list of common available wavelengths at the previous NEs. In an embodiment, the method 700 may receive a least loaded wavelength vector corresponding to a previous portion of the path and comprising the minimum number of available or unassigned links or fibers for each wavelength or wavelength channel. For instance, the minimum number of available links or fibers may be combined in the form of a single-row (or single-column) matrix with each column (or row) corresponding to one of the wavelengths or channels. The method 700 may then proceed to block 720.

At block 720, the method 700 may obtain at least some of the local available wavelengths at the NE. For instance, the method 700 may obtain a list of available wavelengths associated with the NE's egress ports. In an embodiment, the method 700 may obtain a local wavelength assignment or usage vector comprising the number of local assigned links at the NE or the number of local assigned fibers in each link for each wavelength or wavelength channel. For instance, the number of local assigned links or fibers may be combined in the form of a single-row (or single-column) matrix with each column (or row) corresponding to one of the wavelengths or channels. The wavelength usage vector may then be subtracted from the number of local links or fibers for each wavelength or wavelength channel to obtain a local wavelength availability vector. As such, the local wavelength availability vector may comprise the number of local available assignment options or possibilities for the wavelength or wavelength channel assignment in the link. The method 700 may then proceed to block 730.

At block 730, the method 700 may update the available wavelengths. For instance, the method 700 may combine the list of wavelengths available at the previous NEs with the list of local available wavelengths. In an embodiment, the method 700 may update the least loaded wavelength vector by combining the local wavelength availability vector with the least loaded wavelength vector received from the previous NE. Specifically, the updated least loaded wavelength vector may be obtained by taking a minimum of each column (or row) in the received least loaded wavelength vector and the local wavelength availability vector. For example, the least loaded wavelength vector received from the previous NEs may be represented such as [0 2 1 1 0 1 2 1], which corresponds to eight wavelength channels. As such, the least loaded vector may indicate that there is a minimum of zero, two, one, one, zero, one, two, and one available links at the previous NEs for the first, second, third, fourth, fifth, sixth, seventh, and eighth wavelength channels, respectively. The local wavelength availability vector may be represented such as [2 1 1 0 2 1 2 0], which may indicate that there are two, one, one, zero, two, one, two, and zero local available links for the first, second, third, fourth, fifth, sixth, seventh, and eighth wavelength channels, respectively. Hence, the least loaded wavelength vector may be updated by taking a minimum of each column in the received least loaded wavelength vector and the local wavelength availability vector, which may be represented such as [0 1 1 0 0 1 2 0]. As such, the updated least loaded vector may indicate that there is a minimum of zero, one, one, zero, zero, one, two, and zero combined local available links and received available links from the previous NEs for the first, second, third, fourth, fifth, sixth, seventh, and eighth wavelength channels, respectively. The method 700 may then proceed to block 740.

At block 740, the method 700 may determine whether to implement wavelength conversion based on the updated available wavelengths. In an embodiment, when the number of remaining links and the number of remaining NEs with wavelength conversion capability along the path may not be obtained or received, the method 700 may compare a predetermined threshold to the number of available wavelengths. For instance, the method 700 may compare the threshold to the cardinality of the intersection of available wavelengths, i.e., the total number of wavelengths in a list of common available wavelengths between the NE and the previous NEs. If the cardinality is zero, wavelength conversion should be preformed at the node. Alternatively, the method 700 may compare the threshold to the total number of available or unassigned links or fibers for all wavelengths or wavelength channels in the updated least loaded wavelength vector. For example, the method 700 may compare the threshold to the sum of the column (or row) entries of the least loaded wavelength vector. Further in the alternative, the method 700 may compare the threshold to the largest number of available or unassigned links or fibers for all wavelengths or wavelength channels in the updated least loaded wavelength vector. For example, the method 700 may compare the threshold to the largest column (or row) entry of the least loaded wavelength vector.

In another embodiment, the number of remaining NEs with wavelength conversion capability along the path may not be obtained or received, but the number of remaining links in the path may be known. In such a case, the method 700 may compare a calculated threshold to the number of available wavelengths. The threshold may be calculated as a function of the number of remaining links along the path, which may be obtained from the routing assignment information, in addition to at least one weighting factor. For instance, the calculated threshold may be equal to a product of the weighting factor and the number of remaining links along the path. In another instance, the calculated threshold may be equal to a sum of a first weighting factor and a product of a second weighting factor and the number of remaining links along the path, e.g. $\beta+\alpha$ (number of remaining links).

In another embodiment, the number of remaining links along a path until a NE with wavelength conversion capability may be obtained or received from the routing assignment information. As such, the threshold may be calculated as a function of the number of remaining links until a NE with wavelength conversion capability and at least one weighting factor. The threshold may be calculated as a function of the number of remaining links along the path until the next wavelength converter, which may be obtained from the routing assignment information, in addition to at least one weighting factor. For instance, the calculated threshold may be equal to a product of the weighting factor and the number of remaining links along the path until the next wavelength converter. In another instance, the calculated threshold may be equal to a sum of a first weighting factor and a product of a second weighting factor and the number of remaining links along the path until the next wavelength converter, e.g. $\beta+\alpha$ (number of remaining links until the next wavelength converter).

In any of the above embodiments, the method 700 may provision the NE for wavelength conversion if the number of available wavelengths is about equal to or below the threshold. The method 700 may then proceed to block 750. Otherwise, the method 700 may proceed to block 770 without provisioning the NE for wavelength conversion.

At block 750, the method 700 may assign one of the available wavelengths to a previous portion of the path comprising at least a link coupled to the NE. The wavelength may be assigned randomly or using a wavelength selection scheme, such as a first-fit wavelength selection scheme, a least loaded wavelength selection scheme, or a most used wavelength selection scheme. For instance, the method 700 may assign an available wavelength corresponding to the largest number of available or unassigned links or fibers for all wavelengths or wavelength channels in the updated least loaded wavelength vector, according to a least loaded wavelength selection algorithm. For example, the method 700 may assign the wavelength corresponding to the largest column (or row) entry of the least loaded wavelength vector. The method 700 may then proceed to block 760.

At block 760, the method 700 may reset the available wavelengths. For instance, the method 700 may replace the updated available wavelengths described above with the local available wavelengths. In an embodiment, the local available wavelengths may be embodied as the least loaded wavelength vector. The method 700 may then proceed to block 770. At block 770, the method 700 may forward the available wavelengths to the next NE along the path.

Finally, the last NE in the path may use the wavelength availability information to implement wavelength assignments along the path or the last portion of the path. As such, the last NE may provision the NEs along the path to reserve the assigned wavelengths. For instance, the last NE may communicate a reservation message comprising the assigned wavelength to the last NE that determined that it will have to implement wavelength conversion so that the local wavelength availability information at that NE can be updated. When distributed wavelength assignment along the assigned path is completed and all the NEs along the path are assigned wavelengths, any NE along the path provisioned for wavelength conversion by the method 700 may implement wavelength conversion. As such, the NE may receive optical signals at the wavelength assigned to the previous portion of the path. The NE may then convert the optical signals assigned wavelength to the wavelength assigned to the remaining portion of the path and transmit or forward the optical signals using the new wavelength.

Figure 8:
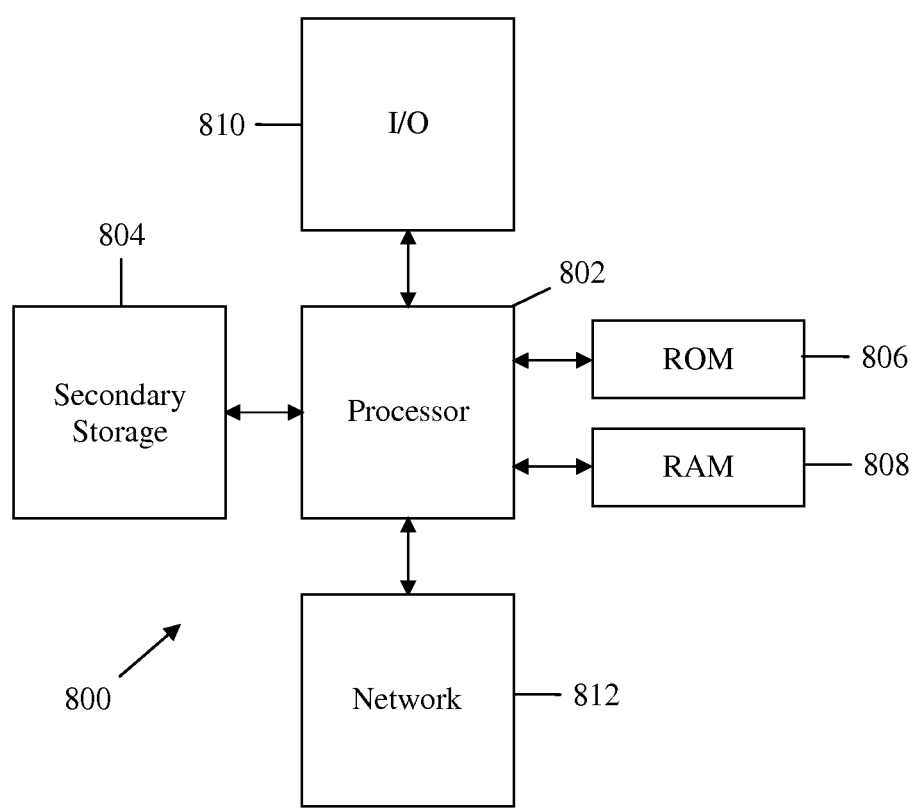
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving a path computation result from a path computation element (PCE) that is unaware of wavelength availability, wherein the path computation result comprises a routing assignment between a source node and a destination node; and
   selecting a wavelength assignment (WA) at an intermediate node along the computed path in a distributed manner via signaling by:
      updating a set of commonly available wavelengths;
      determining a number of links remaining between the intermediate node and the destination node based on the route assignment; and
      performing a wavelength conversion when the set of commonly available wavelengths is reduced to a nonzero threshold,
   wherein the nonzero threshold is equal to a product of a weighting factor and a number of links remaining between the intermediate node and the destination node.

2. The method of claim 1, further comprising receiving a path computation request message from a path computation client (PCC).

3. The method of claim 2, wherein the path computation request message includes one or more of: a path computation type comprising both routing and WA (RWA) or routing only, a restriction on the wavelengths to be used, and specific operator's policy information for WA.

4. The method of claim 1, further comprising sending a path computation reply.

5. The method of claim 4, wherein the path computation reply includes one or more of: the path, wavelengths assigned to the path, and when a valid path is not found, a reason the path is not found.

6. An apparatus comprising:
   a path computation element (PCE) that performs a path computation and is unaware of wavelength availability, wherein wavelength assignment (WA) is selected at an intermediate node along the computed path in a distributed manner via signaling by:
      updating a set of commonly available wavelengths; and
      performing a wavelength conversion when the set of available wavelengths is reduced to a nonzero threshold that indicates the set is too small to permit successful WA completion, and
   wherein the nonzero threshold is equal to a product of a weighting factor and a number of links remaining between the intermediate node and the destination node.

7. The apparatus of claim 6, wherein the PCE receives a path computation request message from a path computation client (PCC).

8. The apparatus of claim 7, wherein the path computation request message includes one or more of: a path computation type comprising both routing and WA (RWA) or routing only, a restriction on the wavelengths to be used, and specific operator's policy information for WA.

9. The apparatus of claim 6, wherein the PCE sends a path computation reply.

10. The apparatus of claim 9, wherein the path computation reply includes one or more of: the path, wavelengths assigned to the path, and when a valid path is not found, a reason the path is not found.

11. A method comprising:
selecting wavelength assignment (WA) in a Wavelength Switched Optical Network (WSON), wherein the selecting comprises:
initiating, by a source node, a signaling process to a destination node along a lightpath by declaring wavelength availability through a label object;
deleting, by an intermediate node, some labels from the label object due to connectivity constraints or assignment policy; and
selecting WA at the intermediate node for a portion of the lightpath between the intermediate node and the source node,
wherein WA is selected by the intermediate node when a set of label object labels is reduced to a nonzero threshold, and
wherein the nonzero threshold is equal to a product of a weighting factor and a number of wavelength converters between the intermediate node and the destination node.

12. The method of claim 11, wherein selecting WA includes making a decision on WA, by the destination node, among the wavelengths received through the signaling process.

13. The method of claim 11, wherein the signaling process comprises Generalized Multi-Protocol Label Switching (GMPLS) signaling.

14. The method of claim 11, wherein the lightpath is the output of the routing function.

15. The method of claim 11, wherein the WA is selected on a hop-by-hop basis and is assigned using first-fit, random, or least-loaded methods.

16. An apparatus comprising:
an intermediate node that selects wavelength assignment (WA) in a Wavelength Switched Optical Network (WSON), wherein the selecting comprises:
participating in a signaling process between a source node and a destination node along a lightpath by receiving declared wavelength availability through a label object; and
deleting some labels from the label object due to connectivity constraints or assignment policy; and
performing a wavelength conversion when a set of label object labels is reduced to a nonzero threshold that indicates the set is too small to permit successful WA completion,
wherein the nonzero threshold is equal to a product of a weighting factor and a number of links remaining between the intermediate node and the destination node.

17. The apparatus of claim 16, wherein the signaling process comprises Generalized Multi-Protocol Label Switching (GMPLS) signaling.

18. The apparatus of claim 16, wherein the lightpath is the output of the routing function.

19. The apparatus of claim 16, wherein the WA is selected on a hop-by-hop basis and is assigned using first-fit, random, or least-loaded methods.

* * * * *